United States Patent [19]

Chan

[11] Patent Number: 5,005,034
[45] Date of Patent: Apr. 2, 1991

[54] CAMERA MECHANISM

[75] Inventor: Yet Chan, Kowloon, Hong Kong

[73] Assignee: Achiever Industries, Ltd., Mongkok, Hong Kong

[21] Appl. No.: 508,118

[22] Filed: Apr. 11, 1990

[30] Foreign Application Priority Data

Apr. 14, 1989 [GB] United Kingdom ............... 8908514

[51] Int. Cl.$^5$ .............................................. G03B 17/42
[52] U.S. Cl. .................................... 354/204; 354/245; 354/21; 354/230
[58] Field of Search .............. 354/204, 205, 226, 245, 354/21, 230

[56] References Cited

U.S. PATENT DOCUMENTS 4,342,506  8/1982  Johnson et al. ................... 354/230

FOREIGN PATENT DOCUMENTS 1204684  9/1970  United Kingdom .
1485647  9/1977  United Kingdom .
2186382  7/1986  United Kingdom .

Primary Examiner—L. T. Hix
Assistant Examiner—Cassandra C. Spyrou
Attorney, Agent, or Firm—Christie, Parker & Hale

[57] ABSTRACT

A camera mechanism in which a shutter plate operating member is slidably mounted for movement between a cocked position and rest position and biased by biasing means into said rest position, and in which actuator means is provided for effecting said sliding movement of said shutter plate operating member, said actuator means being adapted to be connected to a film wind-on device of a camera, wherein said actuator means comprises a cam mounted for rotation in said mechanism and an abutment surface on said shutter plate operating member for cooperating with said cam, so that, in use, rotation of the cam causes said shutter plate operating member to move from its rest position to its cocked position against the urging of said biasing means, said cam being provided with force-varying means whereby greater force is needed to rotate the cam over an initial part of the cocking stroke of the shutter plate operating member than is needed for a final part of said cocking stroke.

5 Claims, 2 Drawing Sheets

CAMERA MECHANISM

FIELD OF THE INVENTION

The present invention relates to camera mechanisms and to cameras including such mechanisms.

OBJECT OF THE INVENTION

It is an object of the present invention to provide an improved camera mechanism, and in particular a camera mechanism which has an improved "feel" or tactile sensation for the user so that the user can determine more clearly the state (wound on or not wound on) of the camera. Such a mechanism would be particularly useful in inexpensive mass produced cameras, including disposable cameras. The users of such cameras generally take photographs infrequently, perhaps only during annual vacations and on certain special occasions. The users do not wish to read instructions on each infrequent occasion on which they take photographs. Accordingly, it is very important that the state of the camera and the operation of the camera be apparent from the camera itself without reference to any written instruction.

SUMMARY OF THE INVENTION

The present invention provides a camera mechanism in which a shutter plate operating member is slidably mounted for movement between a cocked position and a rest position and biassed by biassing means into said rest position, and in which actuator means is provided for effecting said sliding movement of said shutter plate operating member, said actuator means being adapted to be connected to a film wind-on device of a camera, wherein said actuator means comprises a cam mounted for rotation in said mechanism and an abutment surface on said shutter plate operating member for cooperating with said cam, so that, in use, rotation of the cam causes said shutter plate operating member to move from its rest position to its cocked position against the urging of said biassing means, said cam being provided with force-varying means whereby greater force is needed to rotate the cam over an initial part of the cocking stroke of the shutter plate operating member than is needed for a final part of said cocking stroke.

The present invention also provides a camera having a camera mechanism as defined hereinbefore.

The effect of varying the force needed to rotate the cam, in the manner defined, is to provide a camera incorporating the mechanism with improved "feel" when the film wind-on device of the camera is used to wind on the film and cock the camera. More particularly, in the case of a camera which has not been cocked, the user may apply pressure to the wind-on mechanism and will then encounter a relatively strong spring resistance. This spring resistance indicates to the user that the camera has not been cocked. If the user does not wish to immediately take a photograph the user may choose to leave the camera in the uncocked state, and can do so by simply suspending further pressure on the wind-on mechanism, safe in the knowledge that the previously applied pressure has not resulted in the camera becoming cocked. Alternatively, if the user does wish to take a photograph immediately, the user may choose to cock the camera and this is done by continuing or increasing the pressure so as to overcome the strong spring resistance, and as the pressure is continued or increased the spring resistance gradually decreases and ceases altogether indicating to the user that the camera is now cocked. Preferably the force-varying means comprises a second cam coaxially mounted for rotation with the first cam, said second cam having a helical cam profile which progressively decreases its radius of curvature in the direction of rotation of the cam during a cocking stroke. A pressure applicator is provided to bear upon the second cam and is, e.g. spring-biassed to apply pressure to the second cam. At an initial part of the cocking stroke the profile of the second cam will have a relatively large radius and thus rotation of the cams will be more impeded by the pressure applicator than will be the case at a later part of the cocking stroke when the profile of the second cam will have a relatively small radius.

Ratchet and pawl means may be provided to ensure that the actuator means can rotate in one direction only.

A stop member may be provided on the pressure applicator to prevent over-rotation of the actuator means by co-acting with a step in the cam profile of the second cam.

The pressure applicator may be provided with an extension so that upon firing of the camera, when the shutter plate operating member returns from its cocked position to its rest position under the action of its biassing means, the extension is contacted by the shutter plate operating member and the stop member is moved out of engagement with the step in the cam profile of the second cam.

BRIEF DESCRIPTION OF THE DRAWINGS

An embodiment of the mechanism of the present invention will now be described, by way of example only, by reference to the accompanying drawings, in which.

DESCRIPTION OF PREFERRED EMBODIMENT

Figure 1:
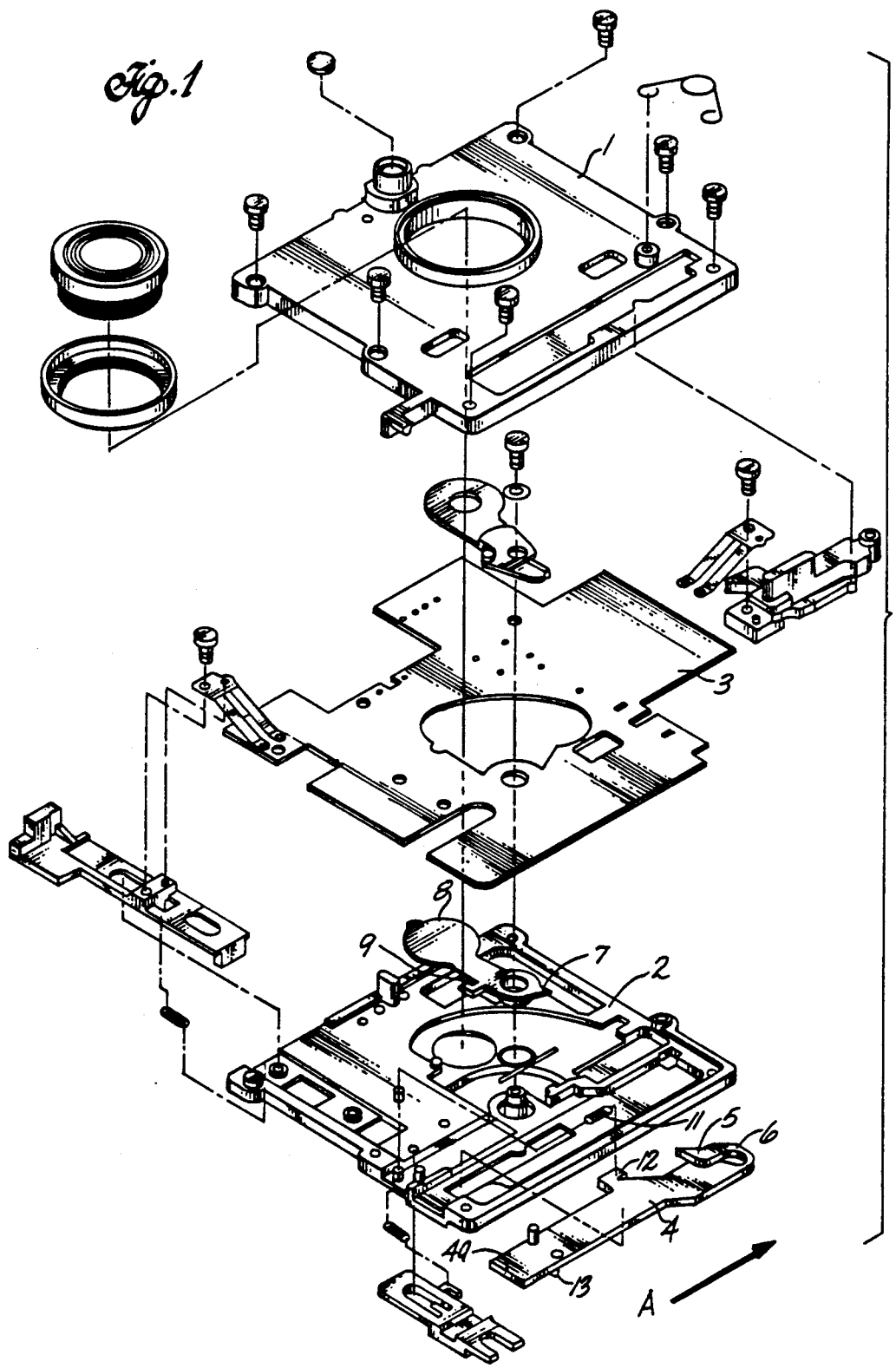
FIG. 1 is an exploded perspective view of a shutter housing located within the camera and containing part of the camera mechanism.
Figure 2:
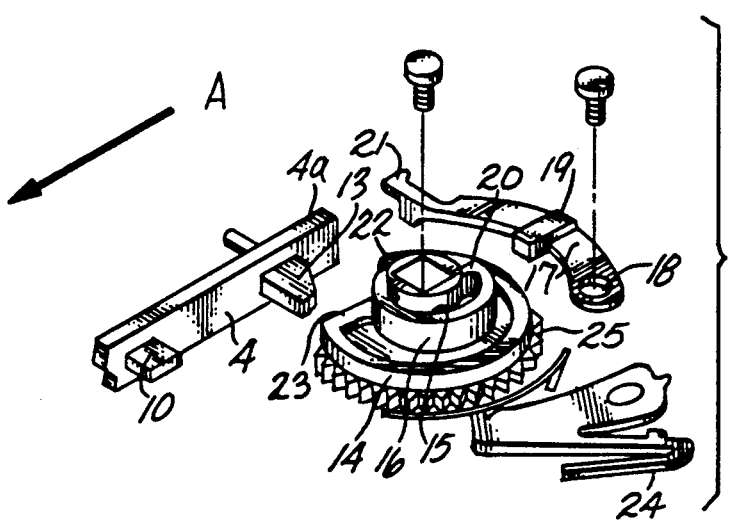
FIG. 2 is an exploded perspective view from a different perspective showing co-operation between one component of the mechanism located within the shutter housing and another component of the mechanism located outside the shutter housing.

Referring to the drawings there is shown a shutter housing comprising a front wall 1 and a rear wall 2. The housing includes a printed circuit board 3 as well as various components of the camera operating mechanism as will be described in more detail hereinafter. The mechanism includes a shutter plate operating member 4. In operation it slides from a rest position (on the left in FIG. 1, on the right in FIG. 2) to a cocked position (on the right in FIG. 1, on the left in FIG. 2) during its cocking stroke, as indicated by arrow A. In so doing a pawl 5 mounted upon a resilient arm 6 deflects and passes beneath a pawl 7 of a pivotably mounted shutter plate 8 (which plate is prevented from counter-clockwise movement by a stop 9). Once this has happened, a projection 10 (shown only in FIG. 2) of the shutter plate operating member 4 is engaged by a trigger device (not shown). The shutter plate operating member 4 is biassed to the rest position by a spring 11 secured to finger 12.

When the trigger device is actuated the spring 11 draws the shutter plate operating member 4 to the rest position and pawls 5 and 7 co-act momentarily to cause the shutter plate 8 to pivot and so to open and close a shutter aperture (not shown) of the camera.

The shutter plate operating member 4 is provided with a rearward projection 13 and an extension 4a, both of which are located outside the shutter housing 1,2.

Mounted for rotation together about an axis perpendicular to the direction of sliding movement of shutter plate operating member 4 are a first cam 14 and a second cam 15. In use, rotation of these elements is effected by a film wind-on lever or knob (not shown).

Cam 15 is provided with a helical cam profile 16 which progressively decreases its radius of curvature with angular orientation. A spring-biassed (by means of a spring, not shown) pressure applicator 17 is mounted for pivotal movement about a pivot 18 and bears upon cam profile 16. The applicator 17 includes a stop member 19 adapted to co-act with a step 20 provided in cam profile 16 and further includes an arm 21. A pawl 24 mounted on the camera housing is provided to cooperate with a ratchet 25 mounted on the cam assembly 14, 15 to ensure that the assembly can rotate in on direction only.

From an initial condition in which the shutter plate operating member 4 is in the rest position, as the film winder is rotated a step 22 in cam 14 co-acts with rearward projection 13 of shutter plate operating member 4 and pushes it in the direction indicated by arrow A to the cocked position. As cam 15 correspondingly rotates, the pressure exerted upon the cam profile 15 by applicator 16 progressively decreases to improve the "feel" of the mechanism.

A rotation continues, the shutter plate operating member 4 eventually reaches its cocked position. At this point, cam 14 can no longer urge shutter operating member 4 any further in the direction indicated by arrow A because of a step 23 provided in cam 14. Moreover at this point stop member 19 of pressure applicator 17 co-acts with step 20 of cam profile 16 to prevent further rotation of assembly 14, 15 and hence of the film winder.

When the shutter button or trigger of the camera (not shown) is pressed, rearward projection 10 of shutter plate operating member 4 is released, shutter plate operating member 4 moves in the opposite direction to arrow A, towards the rest position, shutter plate 8 is momentarily actuated and the shutter plate operating member 4 continues to move towards the rest position.

In the rest position extension 4a of shutter plate operating member 4 has struck arm 21 of pressure applicator 17 and has disengaged stop member 19 of applicator 17 from step 20 of cam profile 16 thereby once more to allow rotation of assembly 14, 15.

The present invention may be performed otherwise than as has been particularly described; all modifications, changes and variations which would be apparent to one skilled in the art are within the scope of the invention.

I claim:

1. A camera mechanism in which a shutter plate operating member is slidably mounted for movement between a cocked position and a rest position and biassed by biassing means into said rest position, and in which actuator means is provided for effecting said sliding movement of said shutter plate operating member, said actuator means being adapted to be connected to a film wind-on device of a camera, wherein said actuator means comprises a cam mounted for rotation in said mechanism and an abutment surface on said shutter plate operating member for cooperating with said cam, so that, in use, rotation of the cam causes said shutter plate operating member to move from its rest position to its cocked position against the urging of said biassing means, said cam being provided with force-varying means whereby greater force is needed to rotate the cam over an initial part of the cocking stroke of the shutter plate operating member than is needed for a final part of said cocking stroke.

2. A camera mechanism according to claim 1 wherein the force-varying means comprises a further cam coaxially mounted for rotation with the aforementioned cam, said further cam having a helical cam profile which progressively decreases its radius of curvature in the direction of rotation thereof during a cocking stroke and wherein a pressure applicator is provided to apply pressure to said further cam.

3. A camera mechanism according to claim 1 or 2, wherein ratchet and pawl means are provided to ensure that the actuator means can rotate in one direction only.

4. A camera mechanism according to claim 1, wherein means are provided to prevent over-rotation of the cam of the actuator means.

5. A camera which includes a camera mechanism as claimed in claim 1.

* * * * *